(12) United States Patent
Park et al.

(10) Patent No.: US 11,926,488 B2
(45) Date of Patent: Mar. 12, 2024

(54) FASTENING COMPONENT SUPPLYING APPARATUS

(71) Applicants: HYUNDAI MOTOR COMPANY, Seoul (KR); KIA MOTORS CORPORATION, Seoul (KR)

(72) Inventors: Jongmin Park, Ulsan (KR); Jung Pyo Kim, Ulsan (KR); Jeong Seong An, Ulsan (KR); Junhyeok Bae, Ulsan (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 705 days.

(21) Appl. No.: 17/103,263

(22) Filed: Nov. 24, 2020

(65) Prior Publication Data

US 2021/0371212 A1 Dec. 2, 2021

(30) Foreign Application Priority Data

May 27, 2020 (KR) .................. 10-2020-0063614

(51) Int. Cl.
*B65G 47/90* (2006.01)
*B23Q 5/28* (2006.01)

(52) U.S. Cl.
CPC .............. *B65G 47/90* (2013.01); *B23Q 5/28* (2013.01); *B65G 2201/02* (2013.01)

(58) Field of Classification Search
CPC .......... B23P 19/004; B23Q 5/28; B65G 47/90
See application file for complete search history.

(56) References Cited

U.S. PATENT DOCUMENTS

| | | | |
|---|---|---|---|
| 2016/0031051 A1* | 2/2016 | Izumiya | B25J 11/00 81/57.37 |
| 2019/0329366 A1* | 10/2019 | Park | B25J 11/005 |
| 2021/0039264 A1* | 2/2021 | Ishizuka | B25J 15/0019 |
| 2021/0094170 A1* | 4/2021 | Park | B23P 19/002 |
| 2021/0187783 A1* | 6/2021 | Bellissimo | B27M 3/04 |

* cited by examiner

*Primary Examiner* — Kyle A Cook
(74) *Attorney, Agent, or Firm* — Lempia Summerfield Katz LLC

(57) ABSTRACT

A fastening component supplying apparatus is disclosed. The disclosed fastening component supplying apparatus according to an exemplary embodiment of the present invention for supplying a plurality of bolts aligned by a bolt aligning device to a fastening portion of a fastening target part includes: a bolt picking unit rotatably installed to an arm front end of a handling robot and picking a plurality of bolts aligned in the bolt aligning device; and a bolt drop unit installed to an arm front end side of the handling robot and dropping the bolts picked by the bolt picking unit to the fastening portion.

15 Claims, 13 Drawing Sheets

FASTENING COMPONENT SUPPLYING APPARATUS

CROSS-REFERENCE TO RELATED APPLICATION

This application claims priority to and the benefit of Korean Patent Application No. 10-2020-0063614 filed in the Korean Intellectual Property Office on May 27, 2020, the entire contents of which are incorporated herein by reference.

BACKGROUND

(a) Field of the Disclosure

An embodiment of the present disclosure relates to an assembly component and assembly system such as an engine and a transmission. More particularly, the present disclosure relates to a fastening component supplying apparatus for supplying a fastening component such as a bolt in a fastening process of an assembly component.

(b) Description of the Related Art

In general, a fastening member including a bolt and a nut is representative of a joint mechanical element for joining two or more parts. Such a fastening member is used in various machinery industry fields including vehicle manufacturing fields.

In a process of assembling assembly components such as an engine, a transmission, a suspension, and the like during a vehicle production process, a fastening target part is fastened to a correlated part by using the fastening component of bolts and nuts.

For example, in an engine assembly line, a head cover as the fastening target part is fastened to a cylinder block as the correlated part using the bolts.

In this process, the head cover suitable for an engine model for each vehicle type is mounted on the cylinder block. The cylinder block and the head cover are pre-fastened with the bolt suitable for the model. The cylinder block and the head cover are normally fastened by a bolt fastening device.

However, in a conventional art, since the work of distributing the bolts to the fasten portion of the fasten target part is performed by hand, a cycle time for assembling the fastening target part and the correlated part may be increased.

The above information disclosed in this Background section is only to enhance understanding of the background of the disclosure. Therefore, the Background section may contain information that does not form the prior art that is already known in this country to a person of ordinary skill in the art.

SUMMARY

Embodiments of the present disclosure are to provide a fastening component supplying apparatus for automatically picking bolts aligned at a predetermined position and distributing them to a fastening portion of a fastening target part.

A fastening component supplying apparatus according to an embodiment of the present disclosure is provided for supplying a plurality of bolts aligned by a bolt aligning device to a fastening portion of a fastening target part. The fastening component supplying apparatus includes: a bolt picking unit rotatably installed to an arm front end of a handling robot and configured to pick a plurality of bolts aligned in the bolt aligning device; and a bolt drop unit installed to an arm front end side of the handling robot and configured to drop the plurality of bolts picked by the bolt picking unit to the fastening portion.

In the fastening component supplying apparatus according to an embodiment of the present disclosure, the bolt picking unit may pick the plurality of bolts aligned with a predetermined interval along a circular trajectory in the bolt aligning device by a magnetic force.

In the fastening component supplying apparatus according to an embodiment of the present disclosure, the bolt picking unit may include socket members disposed to be separated along a circumferential direction so as to pick the plurality of bolts with the magnetic force.

In the fastening component supplying apparatus according to an embodiment of the present disclosure, the bolt picking unit may be a magazine type unit or include a magazine that continuously rotates by a predetermined interval of the socket members.

In the fastening component supplying apparatus according to an embodiment of the present disclosure, the bolt drop unit may selectively apply the magnetic force to one of the bolts while it penetrates one of the socket members.

A fastening component supplying apparatus according to an embodiment of the present disclosure is provided for supplying a plurality of bolts aligned by a bolt aligning device to a fastening portion of a fastening target part. The fastening component supplying apparatus includes: a handling robot having a fixing member fixed to a front end portion side of a multi-joint arm and having a rotation device rotatably provided on a front end portion of the multi-joint arm through the fixing member; a disk-shaped rotation member forming penetration holes spaced at a predetermined interval along an edge portion and connected to the rotation device; cylinder-shaped push guides each having a push hole connected to respective ones of the penetration holes and disposed at the lower surface edge portion of the rotation member to be separated; a socket member coupled to the lower end of each of the push guides; a first magnet member having a connection hole connected to the push hole of each push guide and installed at an inside of each of the socket members; and a bolt drop unit installed at the fixing member and configured to drop a bolt picked at the first magnet member to the fastening portion.

In the fastening component supplying apparatus according to an embodiment of the present disclosure, each socket member may be configured to couple to a head portion of the bolt.

In the fastening component supplying apparatus according to an embodiment of the present disclosure, each first magnet member may fix the head portion of the bolt inside the socket member by the magnetic force.

The fastening component supplying apparatus according to an embodiment of the present disclosure may further include: a housing supporting an edge surface of the rotation member through an inner surface of an open upper end of the housing, installed to the rotation member to be movable in up and down directions, and forming guide holes through which the socket members pass on a bottom surface of the housing; and an elastic supporting portion provided between the rotation member and the housing and elastically supporting the up and down movement of the housing for the rotation member.

In the fastening component supplying apparatus according to an embodiment of the present disclosure, the elastic supporting portion may include: a spring guide fixed to a central portion of a lower surface of the rotation member and provided to be coupled to a shaft hollow formed on the bottom surface of the housing; and a spring installed on the spring guide and supporting the lower surface of the rotation member and the bottom surface of the housing at an inside of the housing.

In the fastening component supplying apparatus according to an embodiment of the present disclosure, the bottom surface of the housing may support a protrusion that protrudes from an inside to an upper side while disposing the plurality of bolts aligned along the circular trajectory in the bolt alignment device on an outside thereof.

In the fastening component supplying apparatus according to an embodiment of the present disclosure, a plurality of stoppers protruding at the edge surface of the rotation member to be coupled to the housing and limiting an up and down movement range of the housing may be further included.

In the fastening component supplying apparatus according to an embodiment of the present disclosure, in the housing, slots into which the plurality of stoppers is inserted. The slots may be elongated in the up and down directions.

In the fastening component supplying apparatus according to an embodiment of the present disclosure, the bolt drop unit may include a rod assembly installed on the fixing member to be movable backward and forward in up and down directions and configured to pass through a penetration hole of the rotation member, the push hole of a corresponding one of the push guides, and the connection hole of a corresponding one of the first magnet members.

In the fastening component supplying apparatus according to an embodiment of the present disclosure, the bolt drop unit may include: a first operation cylinder installed to the fixing member to be fixed along the up and down directions; a second operation cylinder connected to the lower end of the first operation cylinder; a first operation rod provided in the first operation cylinder to be movable forward and backward in up and down directions; a second magnet member provided at a free end of the first operation rod; and a second operation rod having a hollow through which the first operation rod passes and provided to be movable backward and forward in the second operation cylinder in up and down directions.

In the fastening component supplying apparatus according to an embodiment of the present disclosure, the first and second operation rods may fix the head portion of a bolt through the second magnet member while simultaneously moving forward and inserting the bolt to the fastening portion.

In the fastening component supplying apparatus according to an embodiment of the present disclosure, the first operation rod may separate the bolt from the second magnet member through the second operation rod while moving backward earlier than the second operation rod.

An embodiment of the present disclosure may automatically distribute a plurality of bolts for fastening the fastening target part and the correlated part to the fastening portion of the fastening target part, thus reducing the cycle time for fastening the fastening target part and the correlated part.

In addition, an effect that can be obtained or that is predicted with an embodiment of the present disclosure is directly or suggestively described in a detailed description of an embodiment of the present disclosure. That is, various effects that are predicted according to an embodiment of the present disclosure will be described within a detailed description to be described later.

BRIEF DESCRIPTION OF THE DRAWINGS

The drawings are intended to be used as references for describing the embodiments of the present disclosure, and the accompanying drawings should not be construed as limiting the technical spirit of the present disclosure.

DETAILED DESCRIPTION OF THE EMBODIMENTS

Figure 1:
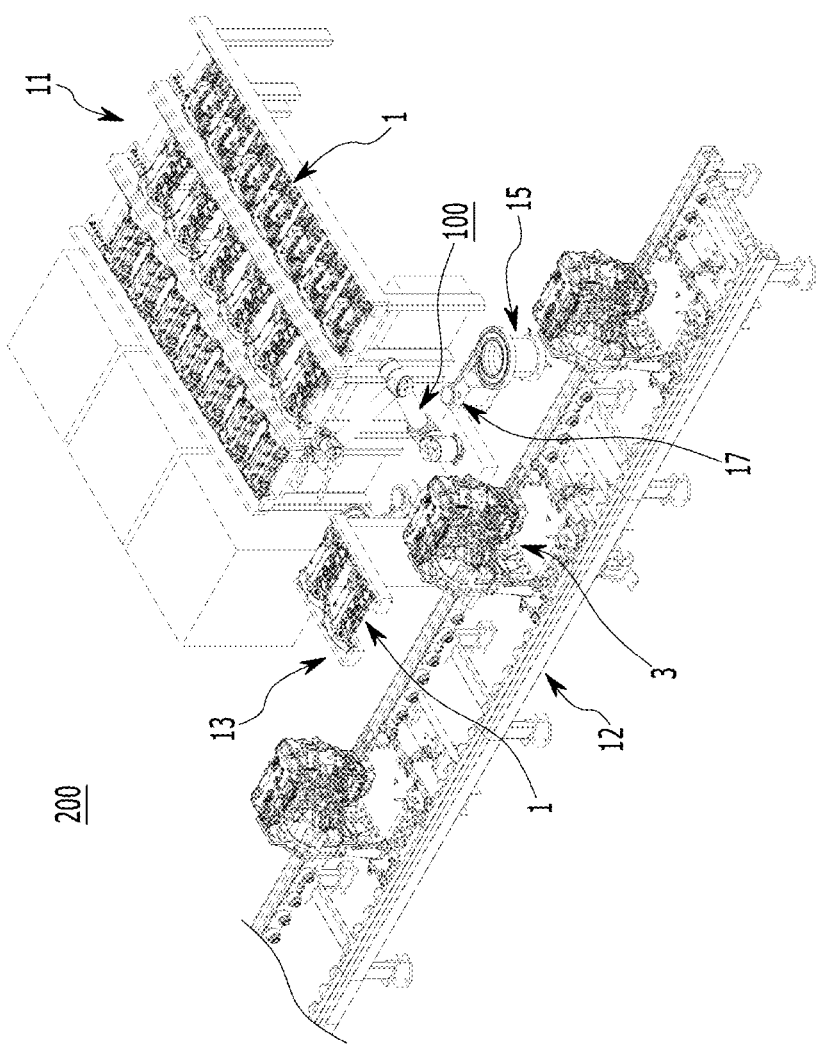
FIG. 1 and FIG. 2 are views showing a component assembly system to which a fastening component supplying apparatus according to an embodiment of the present disclosure is applied.

The present disclosure is described more fully hereinafter with reference to the accompanying drawings, in which embodiments of the disclosure are shown. As those having ordinary skill in the art should realize, the described embodiments may be modified in various different ways, all without departing from the spirit or scope of the present disclosure.

Accordingly, the drawings and description are to be regarded as illustrative in nature and not restrictive. Also, like reference numerals designate like elements throughout the specification.

The size and thickness of each configuration shown in the drawings are arbitrarily shown for better understanding and ease of description. Thus, the present disclosure is not limited thereto, and the thicknesses of portions and regions are exaggerated for clarity.

Further, in the following detailed description, names of constituent elements, which are in the same relationship, are divided into "the first", "the second", and the like. However, the present disclosure is not necessarily limited to the order in the following description.

In addition, unless explicitly described to the contrary, the word "comprise" and variations such as "comprises" or "comprising" should be understood to imply the inclusion of stated elements but not the exclusion of any other elements.

In addition, terms such as " . . . unit", " . . . means", " . . . part", or " . . . member", which are disclosed in the specification, refer to a unit of an inclusive constituent which performs at least one of the functions or operations.

Figure 2:
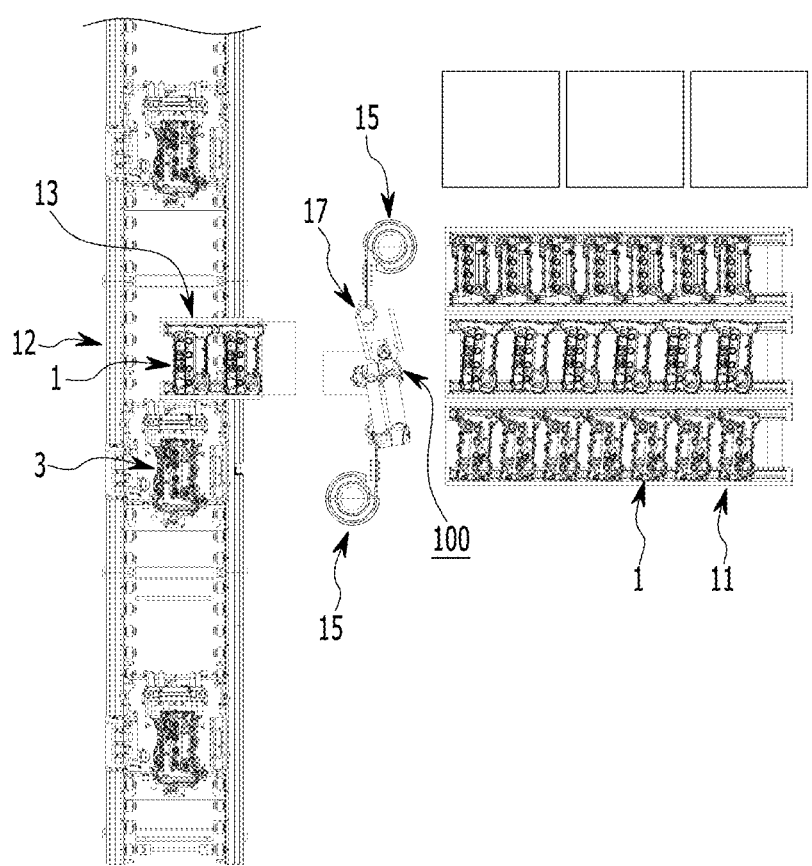

FIG. 1 and FIG. 2 are views showing a component assembly system to which a fastening component supplying apparatus according to an embodiment of the present disclosure is applied.

Referring to FIG. 1 and FIG. 2, a fastening component supplying apparatus 100 according to an embodiment of the present disclosure may be applied to a component assembly system 200 in a process of assembling a chassis assembly component such as an engine, a transmission, and a suspension in a vehicle production factory.

For example, the component assembly system 200 may be applied to a process of fastening a fastening target part forming the chassis assembly component to a correlated part through a fastening component such as a bolt in the assembly process as described above.

Figure 3:
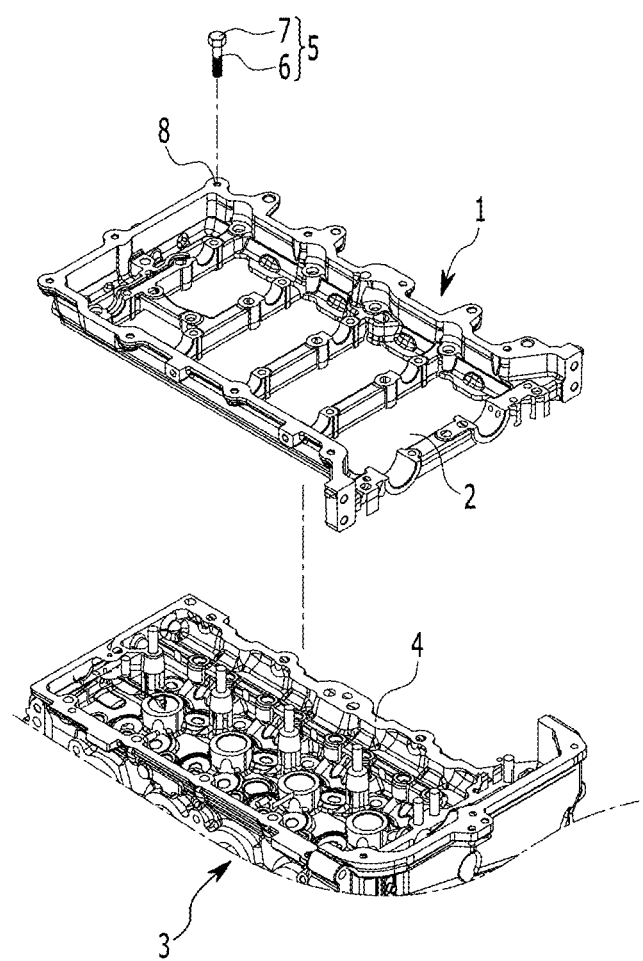
FIG. 3 is a view showing an example of an assembly component to which a fastening component supplying apparatus according to an embodiment of the present disclosure is applied.

Furthermore, the component assembly system 200, as shown in FIG. 3, may be applied to a process of assembling (fastening) a head cover 2 as the fastening target part 1 to a cylinder block 4 as the correlated part 3 through bolts 5 in the engine assembly line. Here, the bolts 5 conventionally include a stem or threaded portion 6 and a head portion 7.

However, it should be understood that the scope of the present disclosure is not limited to assembling the head cover 2 to the cylinder block 4 in the engine assembly line as described above. The technical idea of the present disclosure may be applied to various structures such as an oil pan or a timing chain cover that are bolt-fastened to a correlated part.

Hereinafter, when describing the following constituent elements on the basis of upward/downward directions, a portion facing upwards will be referred to as an upper end portion, an upper portion, an upper end, and an upper surface, and a portion facing downwards will be referred to as a lower end portion, a lower portion, a lower end, and a lower surface.

However, the definition of the directions mentioned above has a relative meaning and the directions may be varied according to an engagement position of a part and the like. Thus, the foregoing reference directions are not limited to a reference direction of the present embodiment.

In addition, hereinafter, an "end (one end or the other end)" may be defined as any one end or may be defined as a predetermined portion (one end portion or the other end portion) including the end.

Meanwhile, the fastening component supplying apparatus 100 according to an embodiment of the present disclosure may distribute the bolts 5 to a fastening hole 8 of the fastening target part 1 in the component assembly system 200.

As shown in FIG. 1 and FIG. 2, the distribution of the bolts 5 by the fastening component supplying apparatus 100 may be carried out in the processes of transporting the fastening target part 1 along a predetermined path through a first conveyor 11 and transporting the correlated part 3 along a predetermined path through a second conveyor 12.

Furthermore, in the component assembly system 200, the fastening target part 1, which has been distributed with the bolts 5, is mounted on a mounting jig 13, and the fastening target part 1 may be pre-fastened to the correlated part 3 through the bolts 5.

Furthermore, in the component assembly system 200, the fastening target part 1 and the bolts 5 suitable for a specific model of the correlated part 3 may be automatically selected. The bolts 5 may be distributed to the fastening target part 1 through robotic cooperative work.

To this end, the fastening component supplying apparatus 100 according to an embodiment of the present disclosure includes a structure that may automatically pick the bolts 5 and distribute them to the fastening holes 8 in the fastening target part 1 in a state in which a plurality of bolts 5 supplied through a bolt feeder 15 are aligned by a bolt aligning device 17.

Figure 4A:
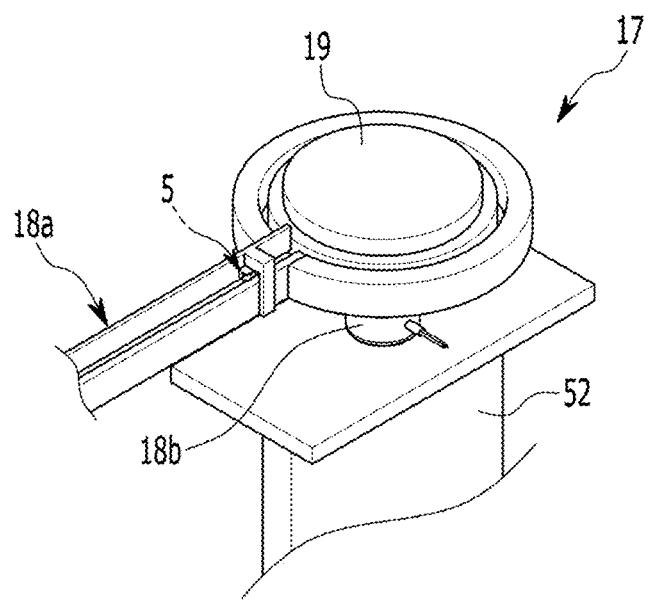
FIG. 4A and FIG. 4B are views schematically showing a bolt aligning device in a component assembly system to which a fastening component supplying apparatus according to an embodiment of the present disclosure is applied.
Figure 4B:
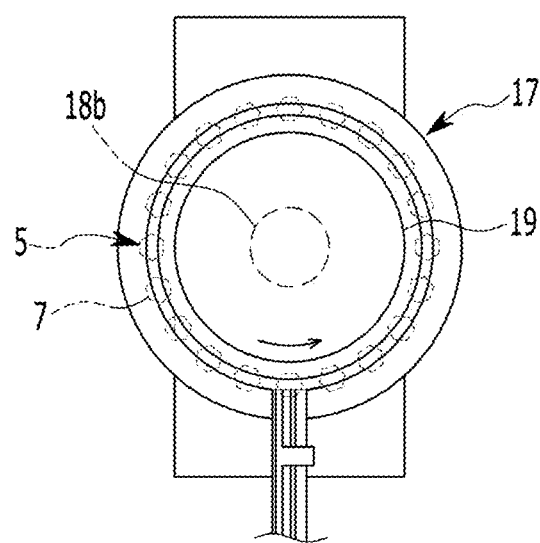

In the above, through the bolt aligning device 17, as shown in FIG. 4A and FIG. 4B, the bolts 5 conveyed along a line feeder 18a may be aligned to be separated by a predetermined interval along a circular trajectory.

Further, the bolt aligning device 17 may align the bolts 5 to be separated by predetermined interval along the circular trajectory so that the head portion 7 faces upward while being rotated by a servo motor 18b. Furthermore, the bolt aligning device 17 forms a protrusion 19 that protrudes from the inside to the upper side while disposing the bolts 5 aligned along the circular trajectory on the outside of the top surface.

Figure 5:
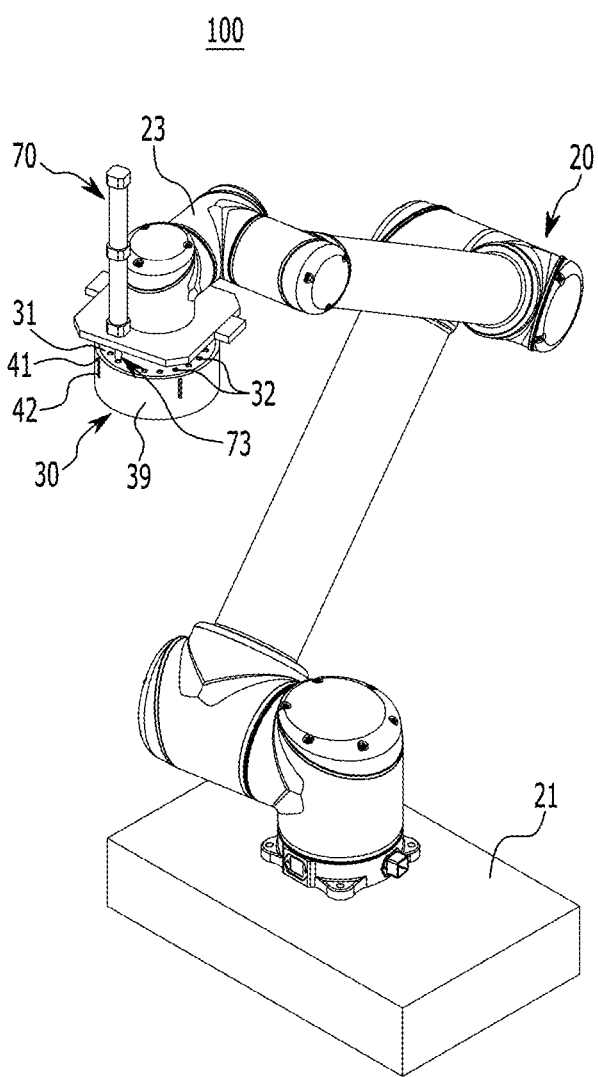
FIG. 5 is a perspective view showing a fastening component supplying apparatus according to an embodiment of the present disclosure.
Figure 6:
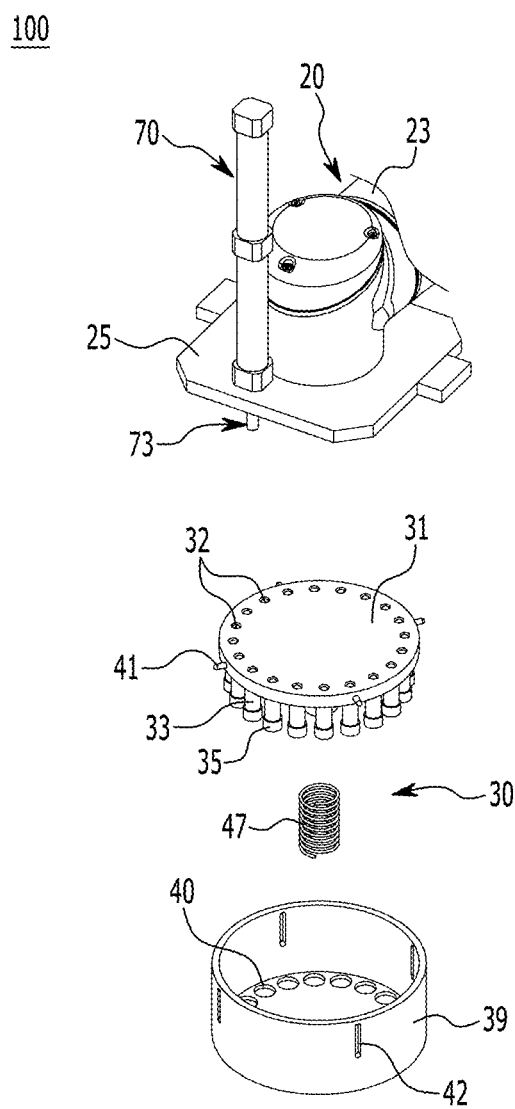
FIG. 6 and FIG. 7 are exploded perspective views showing a fastening component supplying apparatus according to an embodiment of the present disclosure.
Figure 7:
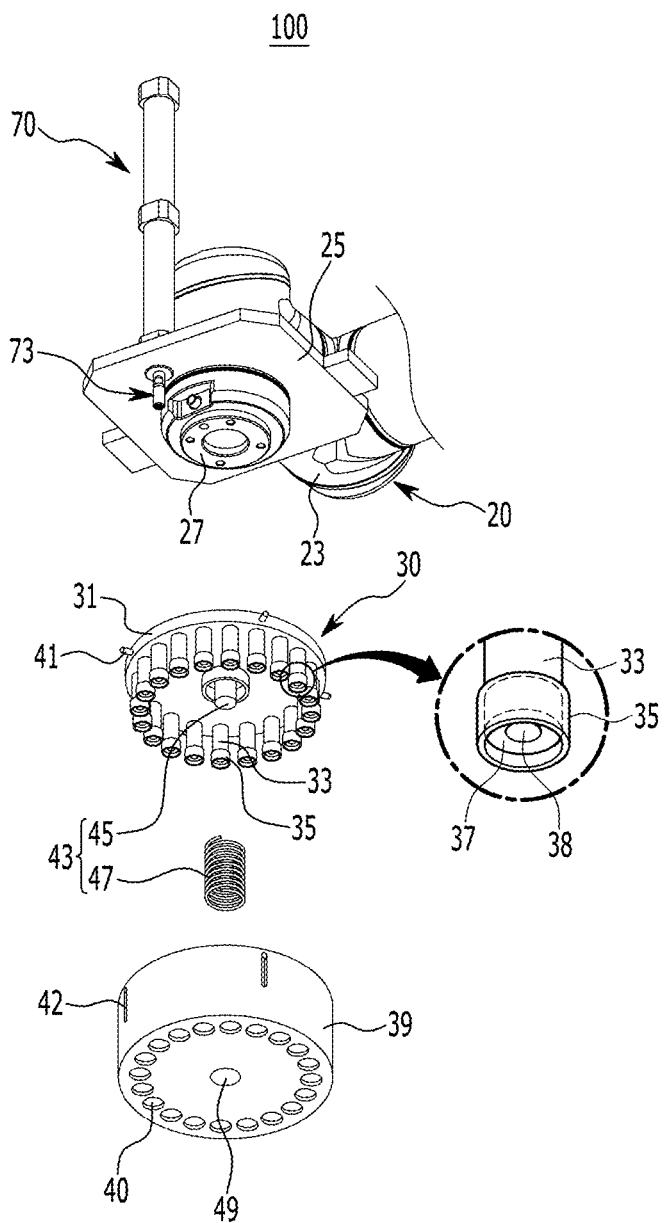
Figure 8:
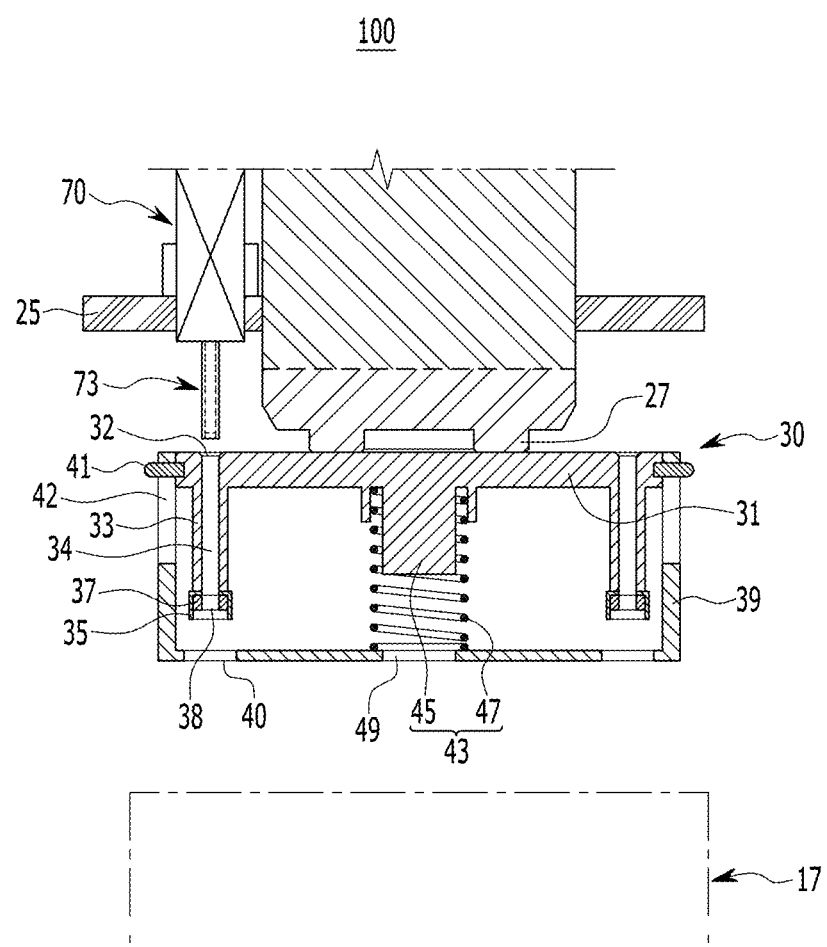
FIG. 8 is a cross-section schematic diagram of a fastening component supplying apparatus according to an embodiment of the present disclosure.

FIG. 5 is a perspective view showing a fastening component supplying apparatus according to an embodiment of the present disclosure. FIG. 6 and FIG. 7 are exploded perspective views showing a fastening component supplying apparatus according to an embodiment of the present disclosure. FIG. 8 is a cross-section schematic diagram of a fastening component supplying apparatus according to an embodiment of the present disclosure.

Referring to FIG. 5-FIG. 8, the fastening component supplying apparatus 100 according to an embodiment of the present disclosure basically includes a handling robot 20, a bolt picking unit 30, and a bolt drop unit 70.

In an embodiment of the present disclosure, the handling robot 20 is provided on the side of the bolt aligning device 17 mentioned above. The handling robot 20 is installed through a base frame 21 on the floor of a work area.

The base frame 21 may be fixed to the floor as shown in the drawing and may be reciprocally and slidably configured in a predetermined direction along a predetermined rail (not shown in the drawing) on the floor thereof.

The handling robot 20 may operate along a predetermined teaching path within a work radius. The handling robot 20 may be provided as a known technology, multi-joint robot that operates robotically with a predetermined torque by a robot controller (not shown in the drawing).

Furthermore, the handling robot 20 according to an embodiment of the present disclosure further includes a fixing member 25 and a rotation device 27 installed on a multi-joint arm 23. The fixing member 25 is provided as a bracket type member and is fixed to the side of the front end portion of the multi-joint arm 23.

Further, the rotation device 27 is rotatably provided in the front end portion of the multi-joint arm 23 through the fixing member 25. The rotation device 27 is provided to rotate in both directions by a motor (not shown in the drawing) at the front end of the multi-joint arm 23. The rotation speed and rotating direction of the motor be controlled by a robot controller.

In an embodiment of the present disclosure, the bolt picking unit 30 picks a plurality of bolts 5 aligned in the bolt aligning device 17 and is installed to be connected to the rotation device 27 in the handling robot 20.

The bolt picking unit 30 may pick up the bolts 5, which are aligned at a certain interval along the circular trajectory in the bolt aligning device 17 by a magnetic force. Furthermore, the bolt picking unit 30 may be provided as a magazine type unit that continuously rotates by a predetermined section or amount by the rotation device 27 in a state in which the bolts 5 are picked by the magnetic force.

The bolt picking unit 30 includes a rotation member 31, a plurality of push guides 33 each having a socket member 35 and a first magnet member 37, a housing 39, a stopper 41, and an elastic supporting portion 43.

The rotation member 31 is provided in a form of a disc and is coupled to the rotation device 27 in the handling robot 20 through a fastening means of a known technology. The rotation member 31 may be rotated in a predetermined direction by the rotation device 27. The rotation member 31 includes a plurality of penetration holes 32 at a predetermined interval in the edge portion of the disc.

The push guides 33 are displaced to be separated by a predetermined interval in the edge portion of the lower surface of the rotation member 31 corresponding to the penetration holes 32. The push guides 33 are provided in a cylinder shape having push holes 34 connected to and aligned with the penetration holes 32.

The socket member 35 of each push guide 33 is provided in a cylinder shape with opened upper and lower ends and is coupled to the lower end of the corresponding push guide 33. The socket member 35 is coupled to the head portion 7 of a bolt 5 and accommodates the head portion 7 inside the socket member.

The first magnet member 37 of each push guide 33 is configured to fix the head portion 7 of the bolt 5 by the magnetic force inside the corresponding socket member 35 and is thus also installed inside the socket member 35. The first magnet member 37 forms a connection hole 38 that is connected to and aligned with the push hole 34 of the push guides 33.

The housing 39 is a housing with an open upper end and a closed lower end. The housing 39 is installed on the rotation member 31 so that it may move in the up and down directions.

The housing 39 supports the edge face of the rotation member 31 through the inner surface around the open upper end. In the housing 39, guide holes 40 are formed through which the corresponding socket members 35 may pass. The guide holes 40 are formed in the edge portion of the bottom surface of the housing 39. In other words, when the rotation member 31 is fixed by the handling robot 20, the housing 39 may support the edge surface of the rotation member 31 and may be moved in up and down directions.

Further, when the housing 39 is fixed, the rotation member 31 may be moved in up and down directions along the inner surface of the housing 39 by the handling robot 20. Furthermore, the bottom surface of the housing 39 supports the upper surface of the protrusion 19 of the bolt aligning device 17 as mentioned above.

The stopper 41 is combined with the housing 39 to limit the vertical movement range of the housing 39. The stopper 41 may be formed to protrude in plural, i.e., as a plurality of protrusions, on the edge surface of the rotation member 31. For example, the protrusions of the stopper 41 may be disposed at 90 degree intervals on the edge surface of the rotation member 31.

Here, the upper end portion of the housing 39 corresponding to the edge surface of the rotation member 31 forms slots 42 of a slit shape so that the corresponding protrusions of the stopper 41 may be inserted and coupled therein.

In addition, the elastic supporting portion 43 is for elastically supporting the vertical movement of the housing 39 with respect to the rotation member 31 and is provided between the rotation member 31 and the housing 39. The elastic supporting portion 43 includes a spring guide 45 and a spring 47.

The spring guide 45 is fixed to the central portion of the lower surface of the rotation member 31 and is provided to be coupled to the shaft hollow 49 provided on the bottom surface of the housing 39.

The spring 47 is installed on the spring guide 45 in the inside of the housing 39 and is provided as a compression coil spring. The spring 47 supports the lower surface of the rotation member 31 and the lower surface of the housing 39 on the inside of the housing 39.

Meanwhile, in an embodiment of the present disclosure, the bolt drop unit 70 is for dropping the picked bolt 5 from the first magnet member 37 of the bolt picking unit 30 into the fastening hole 8 of the fastening target part 1.

The bolt drop unit 70 is installed on the fixing member 25 of the handling robot 20 and may selectively apply the magnetic force to the bolt 5 while penetrating the socket member 35 and the first magnet member 37 through the push guide 33 of the bolt picking unit 30.

Figure 9:
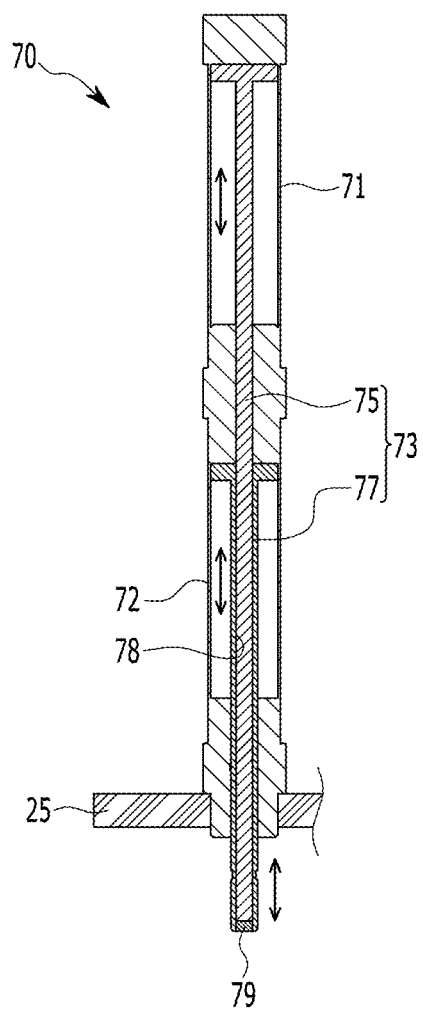
FIG. 9 is a cross-section schematic diagram of a bolt drop unit applied to a fastening component supplying apparatus according to an embodiment of the present disclosure.

FIG. 9 is a cross-section schematic diagram of a bolt drop unit 70 applied to a fastening component supplying apparatus according to an embodiment of the present disclosure.

Referring to the above-disclosed drawings and FIG. 9, the bolt drop unit 70 according to an embodiment of the present disclosure includes a first operation cylinder 71, a second operation cylinder 72, a rod assembly 73, and a second magnet member 79.

The first operation cylinder 71 is fixedly installed on the fixing member 25 along the up and down directions. The second operation cylinder 72 is connected to the lower end of the first operation cylinder 71.

The rod assembly 73 is installed to and along the first and second operation cylinders 71 and 72 to be moved vertically forward and backward in the up and down directions through pneumatic pressure. The rod assembly 73 may penetrate through one of the penetration holes 32 of the rotation member 31 and through the corresponding push hole 34 of the push guide 33, and the connection hole 38 of the first magnet member 37. The rod assembly 73 may push the head portion 7 of the bolt 5 attached to the first magnet member 37 at the inside of the socket member 35.

The rod assembly 73 includes a first operation rod 75 provided to move backward and forward in the up and down directions on the first operation cylinder 71, and a second operation rod 77 provided to move backward and forward in the up and down directions on the second operation cylinder 72.

The first operation rod 75 penetrates the upper end of the second operation cylinder 72. The second operation rod 77 forms a hollow 78 so that the first operation rod 75 penetrates forward and backward to be coupled.

The second magnet member 79 is provided at the front or lower end of the first operation rod 75.

Here, the first and second operation rods 75 and 77 may fix the head portion 7 of the bolt 5 through the second magnet member 79 while simultaneously moving forward and may insert the bolt 5 into the fastening hole 8 of the fastening target part 1.

Furthermore, the first operation rod 75 may separate the bolt 5 from the second magnet member 79 through the second operation rod 77 while moving backward earlier than the second operation rod 77.

Hereinafter, the operation of the fastening component supplying apparatus 100 according to an embodiment of the present disclosure configured as described above is described in detail with reference to the previously disclosed drawings and accompanying drawings.

FIG. 10-FIG. 13 are views to explain an operation of a fastening component supplying apparatus according to an embodiment of the present disclosure.

First, in an embodiment of the present disclosure, the bolts 5 for fastening the fastening target part 1 and the correlated part 3 are supplied and aligned at a predetermined position.

In this process, the bolts 5 supplied through the bolt feeder 15 are aligned to a predetermined position through the bolt aligning device 17. The bolt aligning device 17 aligns the bolts 5 transferred through the line feeder 18a to be separated by the predetermined interval along the circular trajectory. At this time, the bolt aligning device 17 may align the bolts 5 along the circular trajectory so that the head portion 7 faces upward while being rotated by the servo motor 18b.

Figure 10:
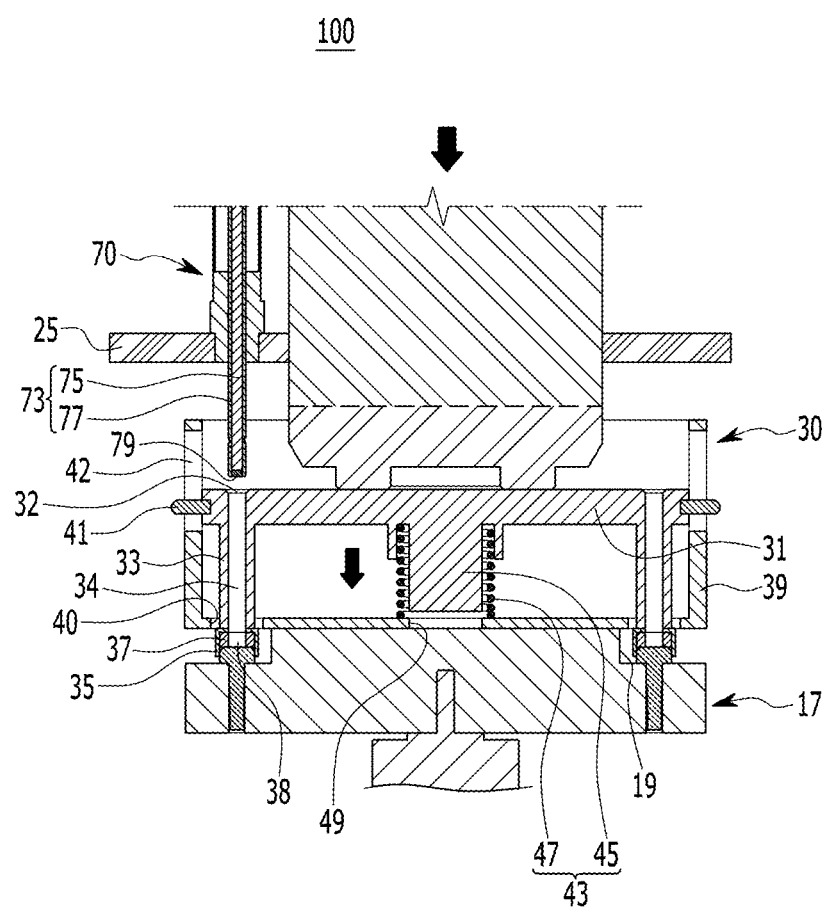
FIG. 10-FIG. 13 are views to explain an operation of a fastening component supplying apparatus according to an embodiment of the present disclosure.

In the state as described above, in an embodiment of the present disclosure, as shown in FIG. 10, the bottom surface side of the housing 39 is moved to the upper surface side of the bolt aligning device 17 by the handling robot 20.

Then, in an embodiment of the present disclosure, the bottom surface of the housing 39 is in close contact with the protrusion 19 of the bolt aligning device 17 by the handling robot 20 and the rotation member 31 is pressed by the handling robot 20.

Accordingly, the rotation member 31 overcomes the elastic force of the spring 47 and moves in the downward direction along the inner surface of the housing 39. The rotation member 31 moves downward while supported by the stopper 41 through the slots 42 of the housing 39.

Then, the socket member 35 coupled to the push guide 33 of the rotation member 31 is protruded in the downward direction of the bottom surface through the guide hole 40 on the bottom surface of the housing 39. At this time, the socket member 35 protrudes from the bolt aligning device 17 to the head portion 7 side of the bolts 5 aligned along the circular trajectory on the outside of the protrusion 19.

Therefore, in an embodiment of the present disclosure, while the head portion 7 of the bolt 5 is coupled to the inner side of the socket member 35, the head portion 7 is fixed (picked) through the first magnet member 37 inside the socket member 35.

Figure 11:
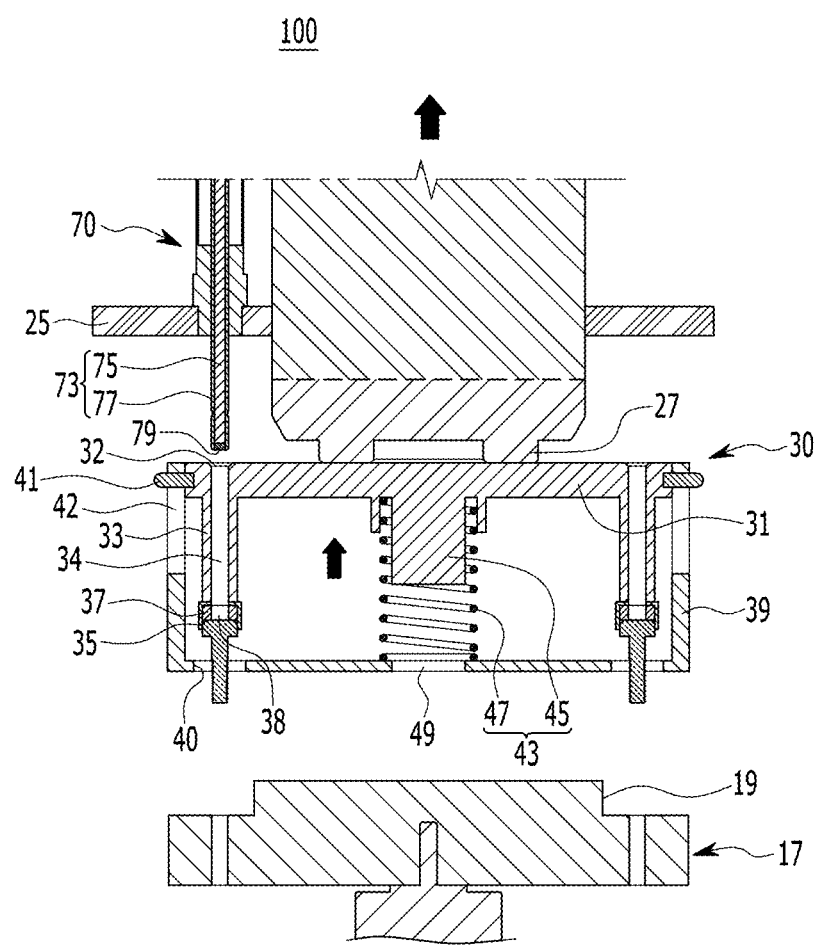

Next, in an embodiment of the present disclosure, when moving the front end of the multi-joint arm 23 of the handling robot 20 in the upward direction, as shown in FIG. 11, the rotation member 31 is also moved in the upward direction.

During this process, the housing 39 is moved to its original position by the elastic restoring force of the spring 47 and is maintained in a state of being supported by the stopper 41 through the slots 42. Accordingly, the socket member 35 is disposed inside the housing 39 through the guide hole 40 and the threaded portion 6 of the bolt 5 remains protruded to the lower side of the bottom surface of the housing 39.

Figure 12:
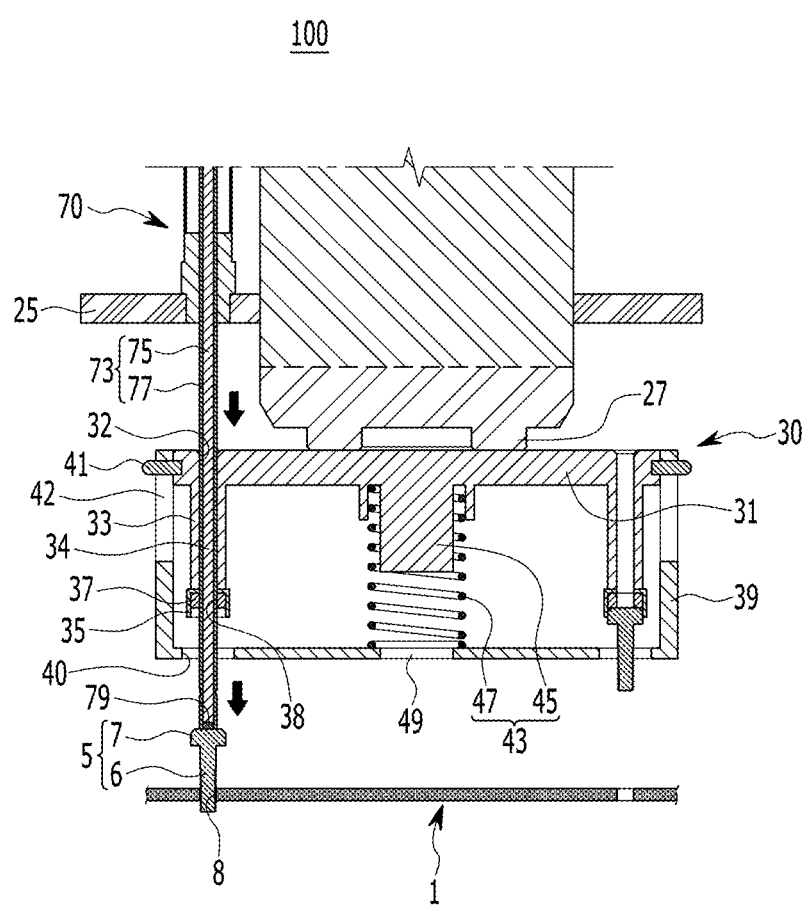

In this state, in an embodiment of the present disclosure, as shown in FIG. 12, the housing 39 is moved to the fastening target part 1 side by the handling robot 20.

Then, in an embodiment of the present disclosure, the threaded portion 6 of the bolt 5 picked on the first magnet member 37 is disposed above the fastening hole 8 of the fastening target part 1. Here, the rod assembly 73 provided in the first and second operation cylinders 71 and 72 of the bolt drop unit 70 is positioned on the fastening hole 8 side of the fastening target part 1 in which the bolt 5 is to be seated.

Subsequently, in an embodiment of the present disclosure, the first and second operation rods 75 and 77 of the first and second operation cylinders 71 and 72 are simultaneously moved forward in the downward direction by pneumatic pressure. At this time, the first operation rod 75 is inserted into the hollow 78 of the second operation rod 77, and the second magnet member 79 provided at the front end of the first operation rod 75 is disposed at the end of the hollow 78 of the second operation rod 77 or penetrates the end to be in a somewhat protruded state.

Accordingly, in an embodiment of the present disclosure, the first and second operation rods 75 and 77 are moved forward through the penetration hole 32 of the rotation member 31, the push hole 34 of the push guide 33, and the connection hole 38 of the first magnet member 37. The head portion 7 of the bolt 5 attached to the first magnet member 37 is pushed in the downward direction at the inside of the socket member 35.

Then, in an embodiment of the present disclosure, in the state that the head portion 7 of the bolt 5 is fixed by the second magnet member 79, the threaded portion 6 of the bolt 5 is partially inserted into the fastening hole 8 of the target part 1 by the forward movement of the first and second operation rods 75 and 77.

Figure 13:
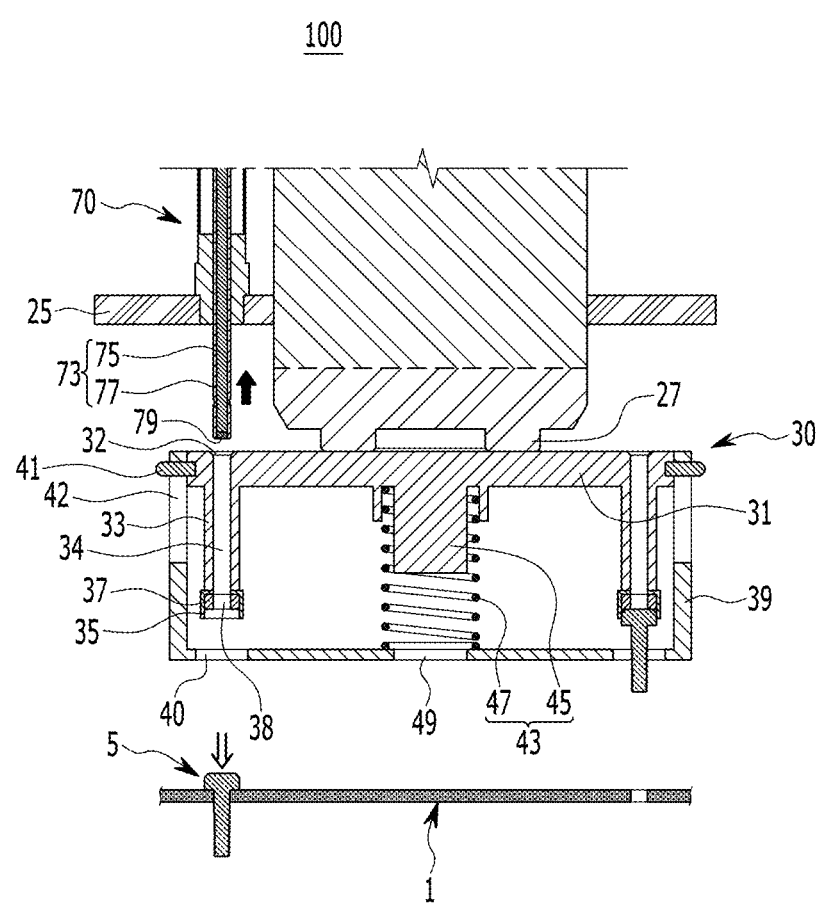

Next, in an embodiment of the present disclosure, as shown in FIG. 13, the first operation rod 75 of the first operation cylinder 71 is moved backward or upward, and the second operation rod 77 of the second operation cylinder 72 is subsequently moved backward or upward. Then, in an embodiment of the present disclosure, the bolt 5 is separated from the second magnet member 79 through the end of the second operation rod 77 and may be seated (completely inserted) in the fastening hole 8 of the fastening target part 1.

Next, in an embodiment of the present disclosure, in the state that the rod assembly 73 of the bolt drop unit 70 is placed at the original position, the rotation member 31 is rotated by the rotation device 27, the threaded portion 6 of another bolt 5 is placed on the other fastening hole 8 side of the fastening target part 1, and the bolt 5 is placed in another fastening hole 8 through the same process as described above.

Therefore, in an embodiment of the present disclosure, the bolts 5 aligned by the bolt aligning device 17 may be picked through the bolt picking unit 30, and the bolts 5 may be distributed to the fastening portion of the fastening target part 1 through the bolt drop unit 70.

Thus, in an embodiment of the present disclosure, a plurality of bolts 5 for fastening the fastening target part 1 and the correlated part 3 are automatically distributed to the fastening portion of the fastening target part 1. Thus, a cycle time due to fastening the fastening target part 1 and the correlated part 3 may be shortened.

Furthermore, in an embodiment of the present disclosure, a plurality of bolts 5 may be distributed in a batch to the fastening portion of the fastening target part 1 as a single device, thereby reducing an equipment investment cost and a space usage area of the production line.

While this disclosure has been described in connection with what are presently considered to be practical embodiments, it is to be understood that the disclosure is not limited to the disclosed embodiments. On the contrary, it is intended to cover various modifications and equivalent arrangements included within the spirit and scope of the appended claims.

<Description of symbols>

| | |
|---|---|
| 1: fastening target part | 2: head cover |
| 3: correlated part | 4: cylinder block |
| 5: bolt | 6: thread portion |
| 7: head portion | 8: fastening hole |
| 11: first conveyor | 12: second conveyor |
| 13: mounting jig | 15: bolt feeder |
| 17: bolt aligning device | 18a: line feeder |
| 18b: servo motor | 19: protrusion |
| 20: handling robot | 21: base frame |
| 23: multi-joint arm | 25: fixing member |
| 27: rotation device | 30: bolt picking unit |
| 31: rotation member | 32: penetration hole |
| 33: push guide | 34: push hole |
| 35: socket member | 37: first magnet member |
| 38: connection hole | 39: housing |
| 40: guide hole | 41: stopper |
| 42: slot | 43: elastic supporting portion |
| 45: spring guide | 47: spring |
| 49: shaft hollow | 70: bolt drop unit |
| 71: first operation cylinder | 72: second operation cylinder |
| 73: rod assembly | 75: first operation rod |
| 77: second operation rod | 78: hollow |
| 79: second magnet member | |
| 100: fastening component supplying apparatus | |
| 200: component assembly system | |

What is claimed is:

1. A fastening component supplying apparatus for supplying a plurality of bolts aligned by a bolt aligning device to a fastening portion of a fastening target part, the fastening component supplying apparatus comprising:
   a bolt picking unit rotatably installed to an arm front end of a handling robot and configured to pick a plurality of bolts aligned in the bolt aligning device; and
   a bolt drop unit installed to an arm front end side of the handling robot and configured to drop the plurality of bolts picked by the bolt picking unit to the fastening portion.

2. The fastening component supplying apparatus of claim 1, wherein
   the bolt picking unit picks the plurality of bolts aligned with a predetermined interval along a circular trajectory in the bolt aligning device by a magnetic force.

3. The fastening component supplying apparatus of claim 1, wherein
   the bolt picking unit includes socket members disposed to be separated along a circumferential direction so as to pick the plurality of bolts with a magnetic force and includes a magazine type unit that continuously rotates by a predetermined interval of the socket members.

4. The fastening component supplying apparatus of claim 3, wherein
   the bolt drop unit selectively applies a magnetic force to one of the plurality of bolts while it penetrates one of the socket members.

5. A fastening component supplying apparatus for supplying a plurality of bolts aligned by a bolt aligning device to a fastening portion of a fastening target part, the fastening component supplying apparatus comprising:
   a handling robot having a fixing member fixed to a front end portion side of a multi-joint arm and having a rotation device rotatably provided on a front end portion of the multi-joint arm through the fixing member;
   a disk-shaped rotation member forming penetration holes spaced at a predetermined interval along an edge portion and connected to the rotation device;
   cylinder-shaped push guides each having a push hole connected to respective ones of the penetration holes and disposed to be separated by a predetermined interval at a lower surface edge portion of the rotation member;
   a socket member coupled to the lower end of each of the push guides;
   a first magnet member having a connection hole connected to the push hole of each push guide and installed at an inside of each of the socket members; and
   a bolt drop unit installed at the fixing member and configured to drop a bolt picked at the first magnet member to the fastening portion.

6. The fastening component supplying apparatus of claim 5, wherein
   each socket member is configured to couple to a head portion of the bolt, and
   each first magnet member is configured to fix the head portion of the bolt inside the socket member by a magnetic force.

7. The fastening component supplying apparatus of claim 5, wherein
   the bolt drop unit includes a rod assembly installed on the fixing member to be movable backward and forward in up and down directions and configured to pass through a penetration hole of the rotation member, a push hole of a corresponding one of the push guides, and the connection hole of a corresponding one of the first magnet members.

8. The fastening component supplying apparatus of claim 5, wherein
   the bolt drop unit includes:
   a first operation cylinder installed to the fixing member to be fixed along the up and down directions;
   a second operation cylinder connected to the lower end of the first operation cylinder;
   a first operation rod provided in the first operation cylinder to be movable forward and backward in up and down directions;
   a second magnet member provided at a free end of the first operation rod; and
   a second operation rod having a hollow through which the first operation rod passes and provided to be movable backward and forward in the second operation cylinder in up and down directions.

9. The fastening component supplying apparatus of claim 8, wherein
   the first and second operation rods fix the head portion of a bolt through the second magnet member while simultaneously moving forward and inserting the bolt to the fastening portion.

10. The fastening component supplying apparatus of claim 9, wherein
    the first operation rod separates the bolt from the second magnet member through the second operation rod while moving backward earlier than the second operation rod.

11. The fastening component supplying apparatus of claim 5, further comprising:
    a housing supporting an edge surface of the rotation member through an inner surface of an open upper end of the housing, installed to the rotation member to be movable in up and down directions, and forming guide holes through which the socket members pass on a bottom surface of the housing; and
    an elastic supporting portion provided between the rotation member and the housing and elastically supporting the up and down movement of the housing with respect to the rotation member.

12. The fastening component supplying apparatus of claim 11, wherein
the elastic supporting portion includes:
a spring guide fixed to a central portion of a lower surface of the rotation member and provided to be coupled to a shaft hollow formed on the bottom surface of the housing; and
a spring installed on the spring guide and supporting the lower surface of the rotation member and the bottom surface of the housing at an inside of the housing.

13. He fastening component supplying apparatus of claim 11, wherein
the bottom surface of the housing supports a protrusion that protrudes from an inside to an upper side while disposing the plurality of bolts aligned along a circular trajectory in the bolt alignment device on an outside thereof.

14. The fastening component supplying apparatus of claim 11, further comprising
a plurality of stoppers protruding at the edge surface of the rotation member to be coupled to the housing and limiting an up and down movement range of the housing.

15. The fastening component supplying apparatus of claim 14, wherein
the housing comprises slots into which the plurality of stoppers is inserted, and
the slots are elongated in the up and down directions.

* * * * *